March 3, 1959     J. R. ROGERSON     2,875,484
MACHINE FOR PRODUCING FISHING WEIGHTS Filed May 7, 1956     3 Sheets-Sheet 1

John Randall Rogerson
INVENTOR.

BY *Clarence A. O'Brien*
*and Harvey B. Jackson*
Attorneys

March 3, 1959  J. R. ROGERSON  2,875,484
MACHINE FOR PRODUCING FISHING WEIGHTS
Filed May 7, 1956  3 Sheets-Sheet 2

John Randall Rogerson
INVENTOR.

BY
Attorneys

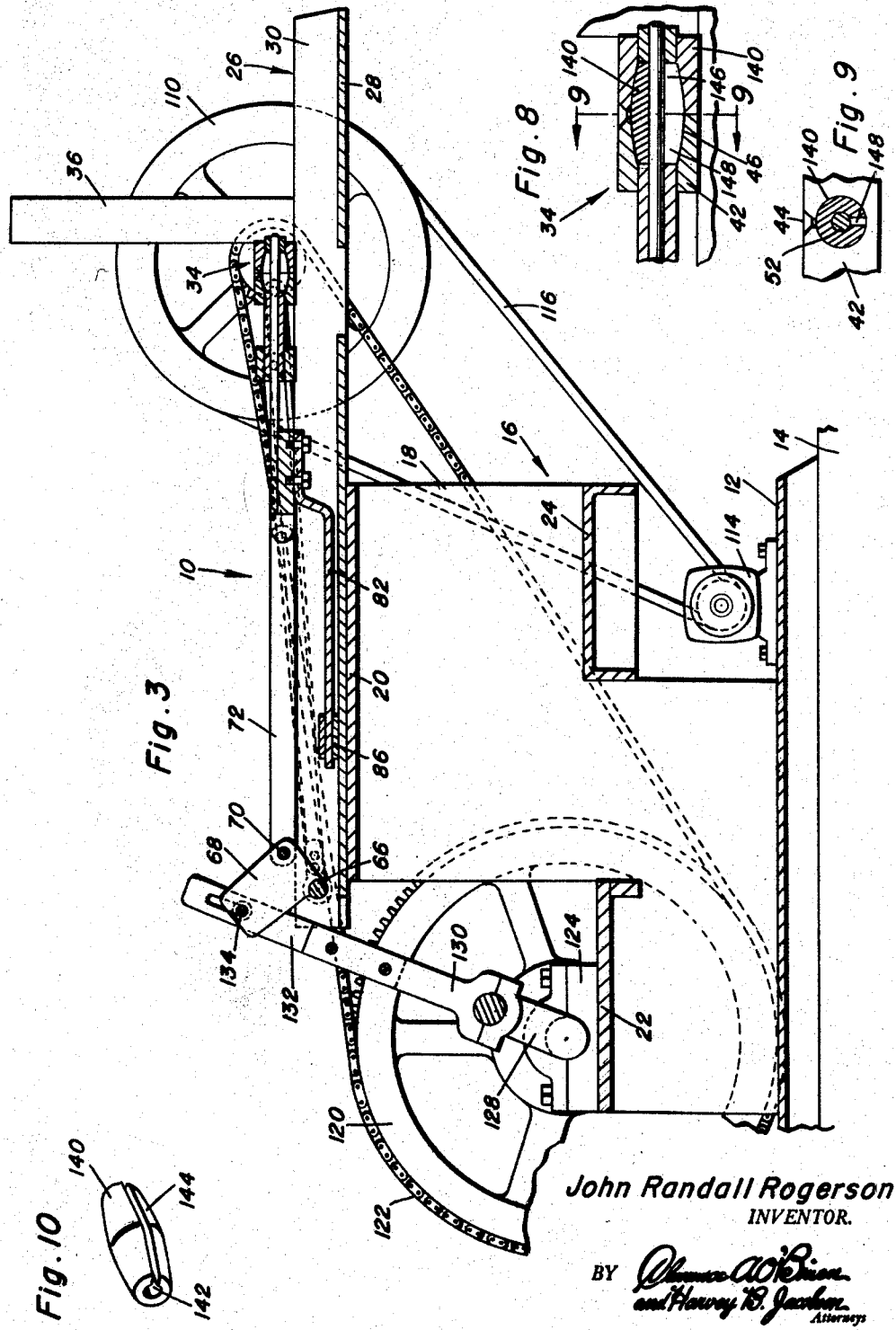

United States Patent Office 2,875,484
Patented Mar. 3, 1959

2,875,484

MACHINE FOR PRODUCING FISHING WEIGHTS

John Randall Rogerson, Leonardville, Charlotte, New Brunswick, Canada

Application May 7, 1956, Serial No. 583,129

6 Claims. (Cl. 22—94)

This invention relates in general to new and useful improvements in molding machines, and more specifically to an improved molding machine for producing fishing weights.

A primary object of this invention is to provide an improved machine for producing fishing weights of the tubular type, the machine including a fixed mold half and a movable mold half together with a core rod, there being provided suitable means for sequentially separating the mold halves, ejecting a fishing weight from the movable mold half and stripping the fishing weight from the core rod.

Another object of this invention is to provide an improved machine for producing fishing weights, the machine being semi-automatic in operation and being so constructed whereby when operated it will open a split mold and eject a molded fishing weight therefrom, after which the split mold is closed ready for the next charge of molten metal.

Still another object of this invention is to provide an improved machine for producing fishing weights, the machine including a fixed mold half and a movable mold half, the movable mold half being journaled on an ejector, the ejector having journaled therein a core rod, there being connected to the movable mold half, the ejector and the core rod means for moving the three relative to each other and to the fixed mold half whereby the mold is first opened, then a weight formed therein is ejected from the movable mold half and finally the weight is stripped from the core rod.

A further object of this invention is to provide an improved mechanism for operating an ejecting type mold of the split half type, the mechanism including a plurality of links connected to a rocker shaft by means of a plurality of crank throws, the crank throws being of different length whereby the rate of movement of the various links and the mechanism connected thereto will be different so as to produce a sequential opening of the mold, the ejecting of an article cast therein and finally the stripping of such article from a core rod.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged longitudinal sectional view taken substantially upon the plane indicated by the section line 3—3 of Figure 2 and shows further the specific details of the machine, a hopper for receiving molded weights being omitted for purposes of clarity;

Figure 8 is an enlarged fragmentary longitudinal sectional view taken through the mold of Figure 4 and shows the mold halves provided with a suitable insert;

Figure 9 is an enlarged fragmentary transverse sectional view taken substantially upon the plane indicated by the section line 9—9 of Figure 8 and shows further the details of the mold; and Figure 10 is an enlarged perspective view of a fishing weight formed with the inserts in the mold, the weight being rotated slightly.

Figure 1:
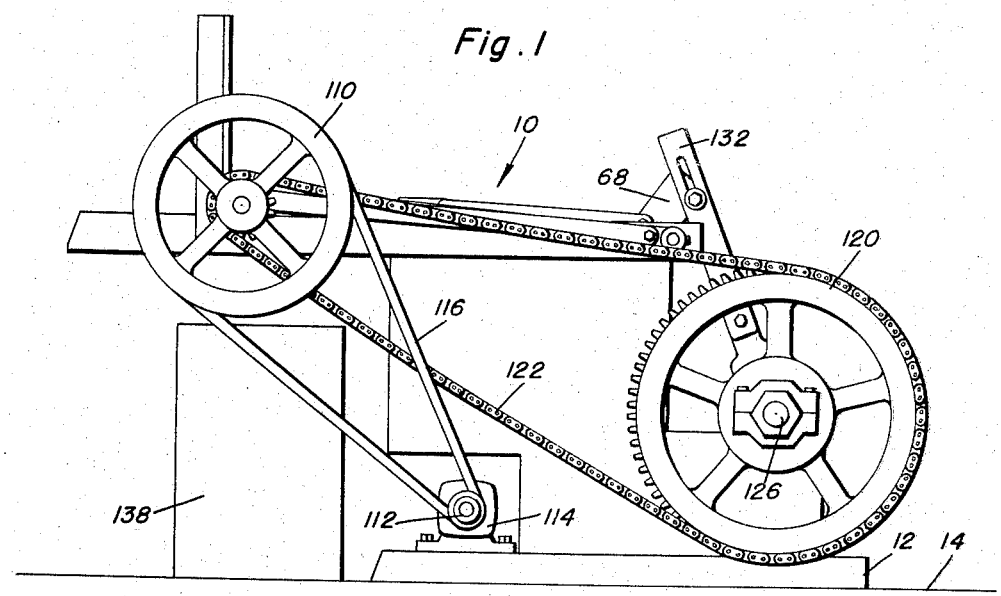
Figure 1 is a side elevational view of the machine for producing fishing weights and shows generally the detail thereof.

Referring now to the drawings in detail, it will be seen that there is illustrated the machine for producing fishing weights, the machine being the subject of this invention and being referred to in general by the reference numeral 10. The machine 10 includes a base 12 which is seated on a suitable foundation 14. Extending upwardly from the base 12 is a frame which is referred to in general by the reference numeral 16.

The frame 16 is formed of a pair of side plates 18 which are generally Z-shaped in outline, as is best illustrated in Figure 3. The side plates 18 have their lower edges suitably secured to the base 12. The upper edges of the side plates 18 are connected together by a top plate 20. The lower rear parts of the side plates 18 are connected together by a suitable platform 22. A channel member 24 extends between the lower forward parts of the side plates 18 so as to connect them together into a rigid unit.

Overlying the top plate 20 and rigidly secured thereto is an elongated tray structure which is referred to in general by the reference numeral 26. The tray structure 26 includes a bottom plate 28 and a pair of side flanges 30 and 32.

Carried by the forward part of the tray 26 is a mold assembly which is referred to in general by the reference numeral 34. The mold assembly 34 includes a pair of uprights 36 and 38 carried by the flanges 30 and 32, respectively. Secured to the uprights 36 and 38 and extending across the upper edges of the flanges 30 and 32 is a fixed mold half 40. Resting upon the flanges 30 and 32 and cooperating with the fixed mold half 40 is a movable mold half 42.

Figure 4:
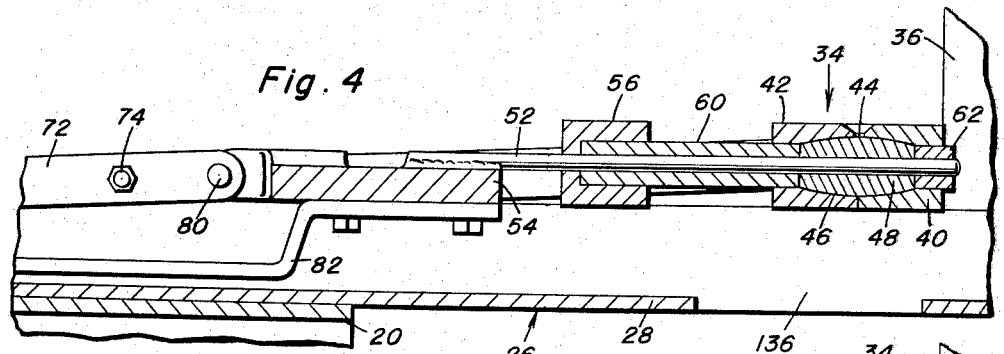
Figure 4 is an enlarged fragmentary sectional view taken through the mold portion of the machine and shows the specific details of the various components of the mold at the end of a casting operation.
Figure 5:
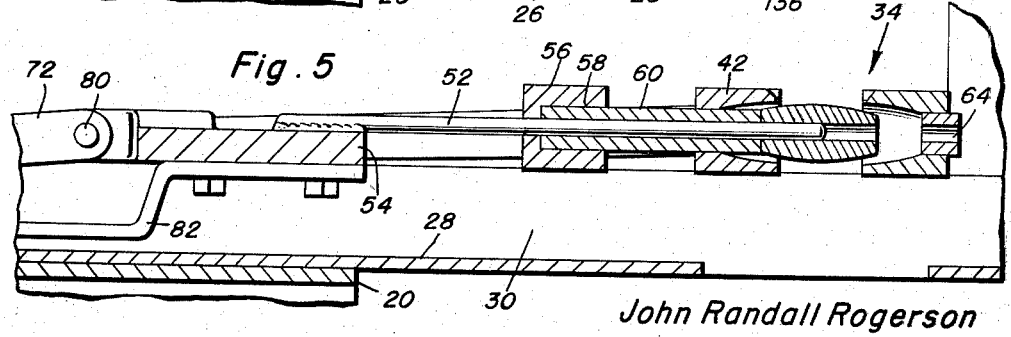
Figure 5 is a view similar to Figure 4 and shows a mold in an intermediate stage of releasing a fishing weight therefrom, the fishing weight having been ejected from the mold and being stripped from a core rod thereof.

The mold halves 40 and 42 are in opposed abutting relation, as is best illustrated in Figure 4, they have formed in the upper part thereof a spruce hole 44. The interiors of the mold halves 40 and 42 are hollowed out to form a cavity 46 for forming a fishing weight 48 of the desired configuration. It is to be understood that the mold assembly 34 is intended for simultaneously casting a plurality of fishing weights 48 and that there will be a plurality of spruce holes 44 and cavities 46. However, for the purpose of this invention only a small part of the mold assembly 34 will be described in more detail hereinafter.

Figure 7:
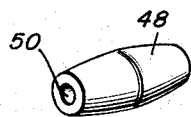
Figure 7 is an enlarged perspective view of a completed fishing weight.
Figure 2:
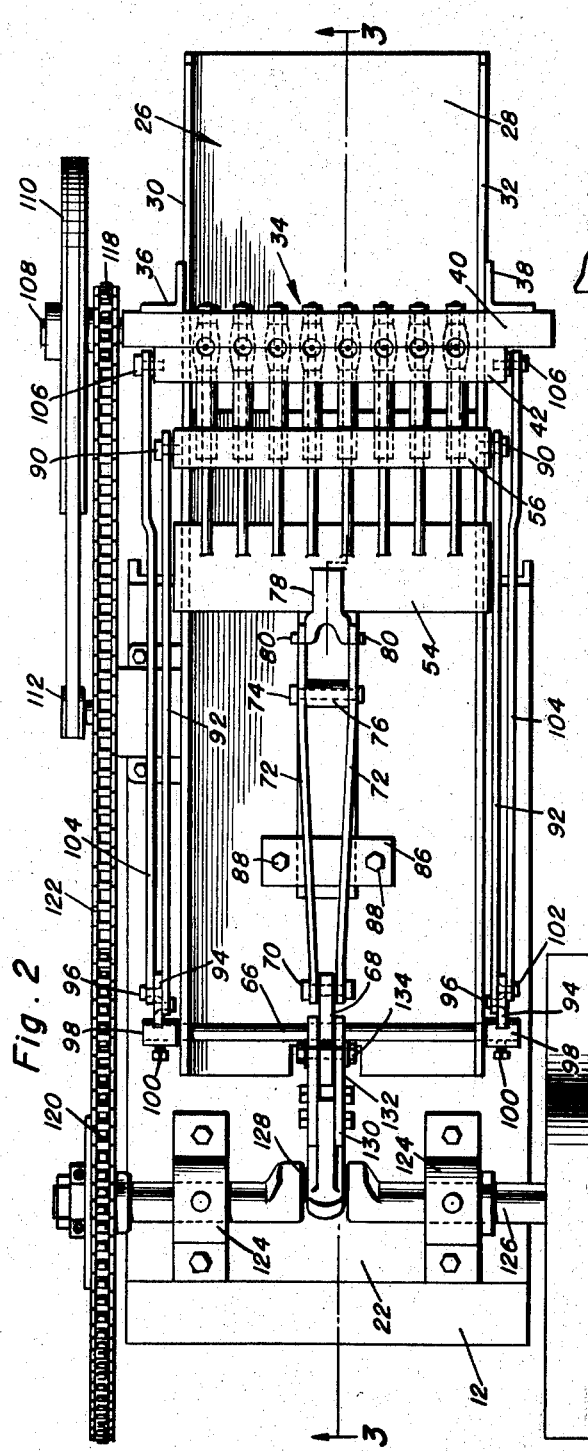
Figure 2 is an enlarged top plan view of the machine of Figure 1, the view being rotated 180° from Figure 1.

As is best illustrated in Figure 7, the fishing weight 48 is provided with a bore 50 therethrough and is of the tubular type. In order that the hole 50 may be formed in the fishing weight 48 during the casting operation, there is provided for each part of the mold assembly 34 a core rod 52. The core rods 52 have their rear ends rigidly welded or otherwise secured to a plate 54 which extends transversely of the tray 26 and rides upon the upper edges of the flanges 30 and 32 thereof.

Disposed intermediate the plate 54 and the movable mold half 42 is a transverse bar 56 which also rides upon the upper edges of the flanges 30 and 32. The bar 56 is provided with a forwardly opening bore 58 for each part of the mold assembly 34. Positioned within each of the bores 58 and extending forwardly therefrom is a tubular ejector 60. Each ejector 60 has journaled therein an associated one of the core rods 52. Further, each ejector 60 has slidably journaled thereon an associated part of the movable mold half 42. As is best illustrated in Figure 4, the forward end of each ejector 60 functions as a plug for the rear part of the associated part of the movable mold half 42. The forward end of each part of the mold half 40 is provided with a short plug 62 having a bore 64 receiving a forward end of the core rod 52 when the mold assembly 34 is in a casting position.

In order that the mold assembly 34 may be actuated to be opened, a fishing weight ejected therefrom and then be closed again, there is provided a suitable mechanism connected to the mold assembly 34. This mechanism includes a transverse rocker shaft 66 which extends through and is journaled in the flanges 30 and 32. The rocker shaft 66 is provided with a centrally located plate 68 which functions as a crank throw. Pivotally connected to the forward part of the crank throw 68 by means of a pivot pin 70 is a pair of forwardly extending links 72. The forward portions of the links 72 are connected together by a fastener 74 having a spacer block 76 positioned thereon, the spacer block 76 being disposed between the links 72. The extreme forward ends of the links 72 are pivotally connected to the plate 54 by means of a fitting 78 having suitable journal portions 80 receiving the forward ends of the links 72.

At this time, it is pointed out that the plate 54 is guided against twisting movement by means of an elongated guide rod 82 secured to the underside of the plate 54 by means of suitable fasteners 84. The guide rod 82 extends rearwardly from the plate 54 and is suitably journaled in a transverse guide member 86 secured to the bottom plate 28 of the tray structure 26 by means of fasteners 88.

In order that the transverse bar 56 and the ejector 60 carried thereby may be reciprocated, there is secured to opposite ends of the bar 56 by means of pivot connectors 90 elongated links 92. The rear ends of the links 92 are connected to crank throw members 94 by means of pivot members 96. The crank throw members 94 are secured to sleeves 98 which are adjustably secured on the ends of the rocker shaft 66 by means of set-screws 100.

The crank throw members 94 also have pivotally connected thereto by means of pivot members 102 elongated links 104. The forward ends of the links 104 are connected to opposite ends of the movable mold half 42 by means of pivot members 106.

In order that the rocker shaft 66 may be rocked back and forth as desired, there is carried by one end of the fixed mold half 40 a shaft 108, the shaft 108 being suitably journaled with respect to the mold half 40. Mounted on the shaft 108 is an enlarged pulley 110 which is aligned with a drive pulley 112 of an electric motor 114, the electric motor 114 being seated on the base 12. Connecting the pulleys 110 and 112 in driving relation is a drive belt 116.

Also mounted on the shaft 108 is a sprocket 118. The sprocket 118 is aligned with an enlarged sprocket 120. Entrained over the sprockets 118 and 120 and drivingly connecting the two together is a drive chain 122.

Suitably journaled in pillow blocks 124 carried by the platform 22 is a crank shaft 126. The crank shaft 126 has mounted on one end thereof the sprocket 120. It is to be understood that the pulleys 112 and 110, the drive belt 116, the sprockets 118 and 120, and the drive chain 122 merely are used to form a reduction drive and that the various components may be replaced by a simple gear box disposed between the electric motor 114 and the crank shaft 126.

The crank shaft 126 includes a central crank throw 128 which has pivotally connected thereto an elongated connecting rod 130. The connecting rod 130 includes a bifurcated upper part 132 which is disposed on opposite sides of the crank throw member 68 and which is connected thereto by a pivot connector 134. Thus when the crank shaft 126 is rotated, the rocker shaft 66 is rocked back and forth.

At this time, it is pointed out that the effective throw for the link 72 is greater than the effective throw for either the links 92 or the links 104. Further, the effective throw for the links 104 is greater than the effective throw for the links 92. The links 72, 92 and 104 are so adjusted whereby when the rocker shaft 66 is in a forward-most position, the various components of the mold assembly 34 will appear as is best illustrated in Figure 4. When the rocker shaft 66 is rocked towards a rearmost position, the movable mold half 42, the ejector 60 and the core rod 52 are simultaneously moved rearwardly. However, because of the difference in lengths of the throws for the links 72, 92 and 104, the core rod 52 will move the farthest and at the fastest rate. The movable mold half 42 will move the next fastest and the next farthest. The ejector 60 will move the slowest and the least amount. As a result, as the various components of the mold assembly 34 move rearwardly away from the fixed mold half 40, the movable mold half 42 will move rearwardly on the ejector 60 and cause the ejection of the fishing weight 48 therefrom. At the same time, the core rod 52 will move rearwardly through the ejector 60 and result in the stripping of the weight 48 from the core rod 52. After the mold assembly 34 has opened sufficiently to eject the fishing weight 48 therefrom, the movement will be reversed and the mold assembly 34 again moved to its closed position for receiving another charge of molten metal.

Figure 6:
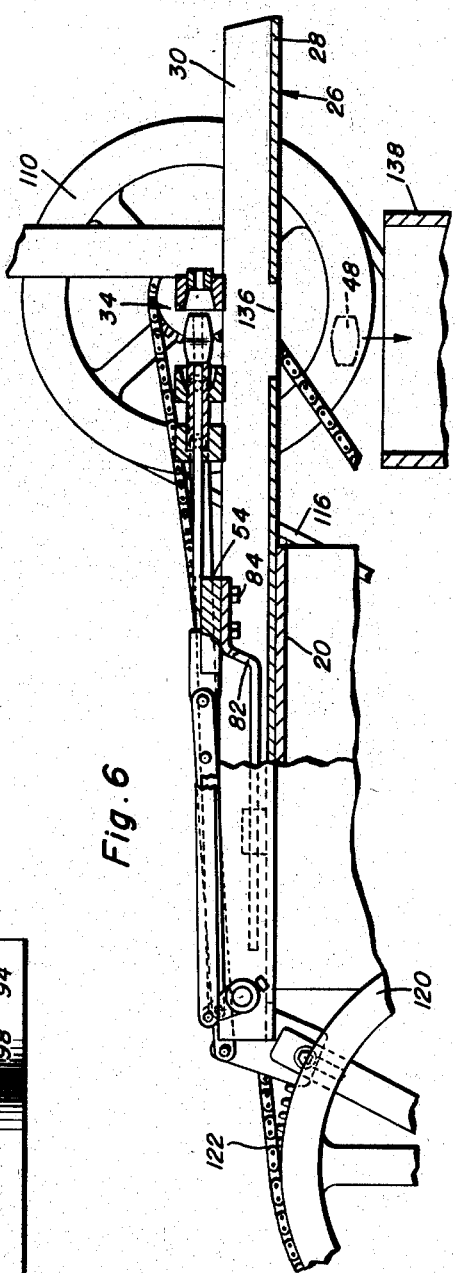
Figure 6 is an enlarged side elevational view of an upper portion of the machine with parts thereof being broken away and shown in section in order to clearly illustrate further the details of the machine.

As is best illustrated in Figures 4 and 6 in particular, the bottom wall 28 of the tray 26 is provided with an opening 136 beneath the mold assembly 34. Disposed beneath the tray 26 is a suitable receptacle 138 aligned with the opening 136 to receive weights 48 ejected from the mold assembly 34.

Referring now to Figure 10 in particular, it will be seen that there is illustrated a modified form of weight which is referred to by the reference numeral 140. The weight 140 is very similar in outline to the weights 48 and has a bore 142 therethrough. However, the weight 140 is also provided with a longitudinal slot 144 which opens into the bore 142. The purpose of the slot 144 is to permit the fastening of the weight 140 in a fishing line, net, etc. at any point therealong without feeding the line through the bore 142.

Referring now to Figures 8 and 9, it will be seen that the mold assembly 34 will have to be modified slightly in order to form the weight 140. This is accomplished by positioning within the lower part of the fixed mold half 40 and the movable mold half 42 narrower, elongated inserts 146 and 148, respectively. The inserts 146 and 148 extend from the bottoms of the cavity 46 up to and in engagement with the core rod 52 thus preventing the cavity 46 from being filled with molten metal in that area.

The function of the machine 10 with the mold assembly 34 modified to include the inserts 146 and 148 will be the same as that described above with respect to the machine 10 when the mold assembly 34 is not provided with the inserts 146 and 148. The only difference will be in the end product, that is the weight 140 will be formed in lieu of the weight 48.

Although no specific mechanism has been illustrated or described for controlling the operation of the machine 10, it is to be understood that the electric motor 114 may be provided with some desirable type of switch control which will permit one complete cycle of the machine 10 every time the electric motor 114 is actuated. One the other hand, if it is so desired, there may be mounted on the supports 36 and 38 a suitable caster which is also connected to the drive mechanism for the mold assembly 34 whereby the machine 10 may be continuously operated with the caster (not shown) operating in sequence with the mold assembly 34.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A machine for producing tubular fishing weights, said machine comprising a fixed mold half and a movable mold half, an ejector, said movable mold half being journaled on said ejector for sliding movement, a core rod journaled in said ejector for sliding movement therethrough, and operating means connected to said movable mold half and said core rod for simultaneously moving the same at different rates.

2. A machine for producing tubular fishing weights, said machine comprising a fixed mold half and a movable mold half, an ejector, said movable mold half being journaled on said ejector for sliding movement, a core rod journaled in said ejector for sliding movement therethrough, means mounting said ejector for sliding movement relative to said fixed mold half, and operating means connected to said movable mold half, said core rod and said ejector for simultaneously moving the same at different rates.

3. A machine for producing tubular fishing weights, said machine comprising a fixed mold half, a movable mold half mounted for movement relative to said fixed mold half, a core rod mounted for movement relative to said mold halves, and means for separating said mold halves, ejecting a weight from said movable mold half, and stripping the weight from said core rod, said means including a combined ejector and stripper, and separate linkage connected to said movable mold half, said core rod and said combined ejector and stripper, a single rocker shaft connected to said linkage, said rocker shaft having throws of different lengths for different ones of said linkage for simultaneously moving said movable mold half, said core rod and said combined ejector and stripper at different rates.

4. A machine for producing tubular fishing weights, said machine comprising a fixed mold half, a movable mold half mounted for movement relative to said fixed mold half, a core rod mounted for movement relative to said mold halves, and means for separating said mold halves, ejecting a weight from said movable mold half, and stripping the weight from said core rod, said means including an ejector, said movable mold half being journaled on said ejector, said core rod being journaled in said ejector, and separate linkage of different movement ratios connected to said movable mold half, said core rod and said ejector, a single rocker shaft connected to said linkage for simultaneously moving individual ones of said linkage at different rates.

5. A machine for producing fishing weights, said machine comprising a fixed mold half, a movable mold half mounted for movement relative to said fixed mold half, a core rod mounted for movement relative to said mold halves, and means for separating said mold halves, ejecting a weight from said movable mold half, and stripping the weight from said core rod, said means including an ejector, said movable mold half being journaled on said ejector, said core rod being journaled in said ejector, and separate linkage connected to said movable mold half, said core rod and said ejector, a single rocker shaft connected to said linkage, said rocker shaft having throws of different lengths for different ones of said linkage for simultaneously moving individual ones of said linkage at different rates.

6. A machine for producing fishing weights, said machine comprising a fixed mold half, a movable mold half mounted for movement relative to said fixed mold half, a core rod mounted for movement relative to said mold halves, and means for separating said mold halves, ejecting a weight from said movable mold half, and stripping the weight from said core rod, said means including an ejector, said movable mold half being journaled on said ejector, said core rod being journaled in said ejector, and separate linkage connected to said movable mold half, said core rod and said ejector, a single rocker shaft connected to said linkage, said rocker shaft having throws of different lengths for different ones of said linkage for simultaneously moving individual ones of said linkage at different rates, the throw for said ejector being the shortest, the throw for the movable mold half being the next longest, and the throw for the core rod being the longest whereby said core rod moves the fastest and the farthest, said movable mold half moves the next fastest and farthest, and said ejector moves the slowest and the shortest distance.

References Cited in the file of this patent

UNITED STATES PATENTS

| | | |
|---|---|---|
| 698,595 | Veeder | Apr. 29, 1902 |
| 1,166,703 | Maunula | Jan. 4, 1916 |
| 1,598,910 | Haynes | Sept. 7, 1926 |
| 1,695,001 | Wood | Dec. 11, 1928 |
| 1,941,811 | Morin | Jan. 2, 1934 |
| 1,961,941 | Pack | June 5, 1934 |
| 1,961,942 | Pack | June 5, 1934 |
| 2,302,367 | Ericson | Nov. 17, 1942 |
| 2,439,782 | Schmid et al. | Apr. 13, 1948 |
| 2,483,093 | Harvey | Sept. 27, 1949 |
| 2,483,094 | Harvey | Sept. 27, 1949 |